3,817,804
METHOD AND APPARATUS FOR FABRICATING FLEXIBLE TUBING

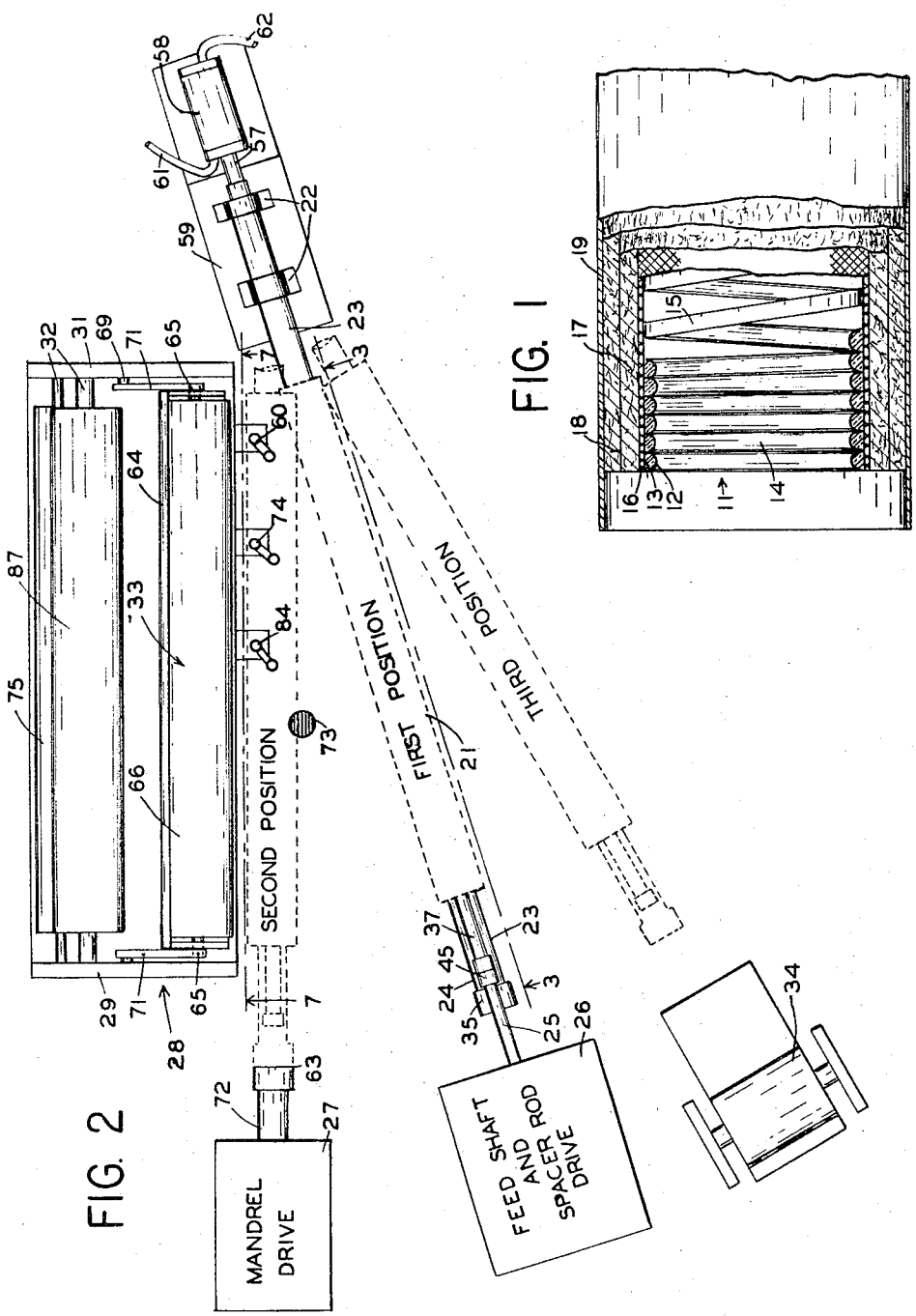

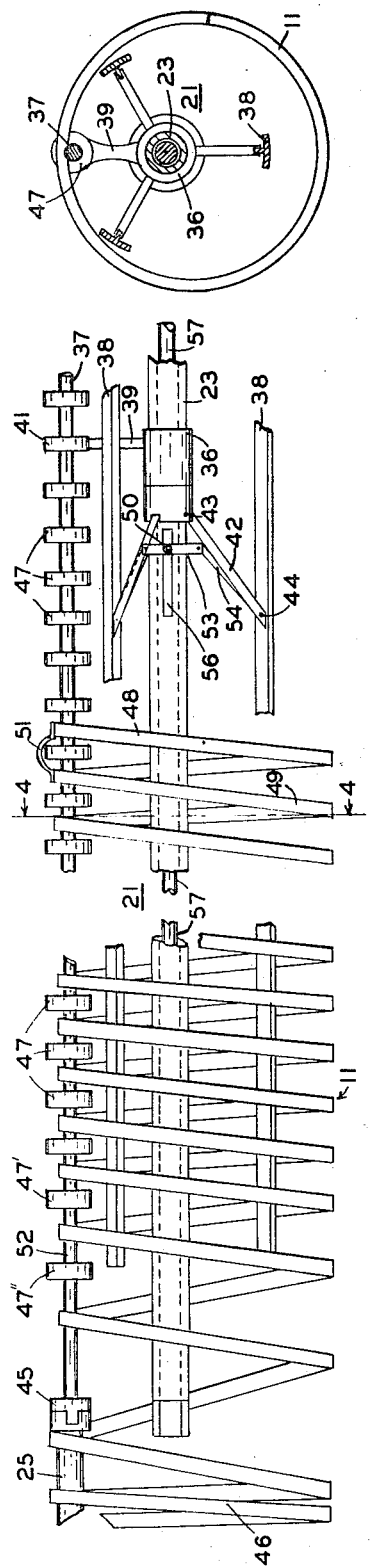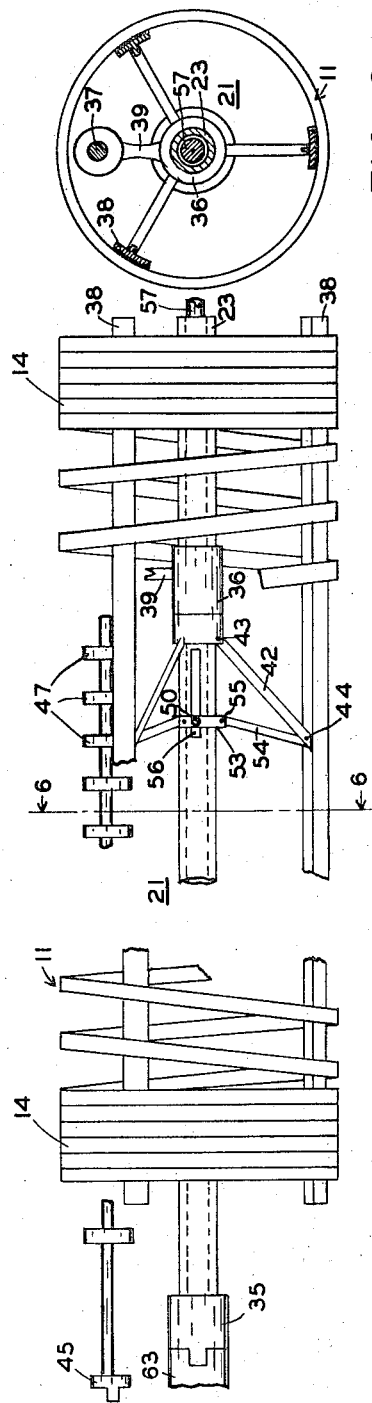

James William Helmick, Toledo, Brownell Wesley Goebel, Waterville, and John Marvin Current, Jerry City, Ohio, assignors to Johns-Manville Corporation, New York, N.Y.
Original application June 6, 1969, Ser. No. 842,766, now Patent No. 3,682,746. Divided and this application Mar. 27, 1972, Ser. No. 238,689
Int. Cl. B31c 13/00
U.S. Cl. 156—144   4 Claims

ABSTRACT OF THE DISCLOSURE

Flexible tubing is formed by preforming a helix, mounting the helix with its turns oriented in a predetermined manner, applying adhesive to the outer surface of the turns, and winding flexible sheet material around the helix to form an envelope over the helix skeleton. A multiplicity of layers of sheet material can be applied. In fabricating a circular duct, a helix of material of fixed cross-section is supported by a mandrel contacting the turns at spaced points as longitudinal bars spaced 120°. Adhesive is applied by an applicator contacting the outer face of the helix turns with a wiping or rolling contact through rotation of the mandrel or the applicator or both. A broad contact area, as afforded by a flattened outer face on each helix turn, sustains sufficient adhesive to penetrate superposed regions of an overlying thin, porous, flexible sheet wound on the helix and adhesively bond another layer of material wound thereover. Insulated tubing can have a plurality of wound layers of insulation in continuous sheet form with the single application of adhesive to bond substrate and at least the first layer of insulation to the helical skeleton and a jacket to retain the outer layers.

Tubing is produced on a multistation apparatus. A composite spacer rod and expandable mandrel shaft has a pivoted mounting end and an opposite end selectively coupled to a first station comprising a helix magazine and a spacer rod drive, to a second station comprising a mandrel drive and to a third station for packeting the assembled duct and unloading it from the mandrel shaft. A rack sustaining roll goods and the adhesive applicator for cooperative manipulation relative to the mandrel mounted helix is located at the second station.

This is a division of application Ser. No. 842,766, filed June 6, 1969, now U.S. Pat. No. 3,682,746.

CROSS-REFERENCE TO RELATED APPLICATIONS

One form of flexible duct which can be produced by the method and apparatus of this invention is disclosed in United States patent application Ser. No. 831,175 by James William Helmick, John Marvin Current and George John Hannes entiled "Flexible Conducit," now abandoned which was filed herewith. A preformed helix of the type for use with this invention and comprising a plurality of resin bonded filaments, advantageously of glass fibers, can be produced by the method and with the apparatus disclosed in United States Pat. No. 3,728,-189 filed herewith by George John Hannes, James William Helmick, James Arnold Dennis and John Marvin Current, entitled "Method and Apparatus for Fabricating a Plurality of Filaments Into a Helix."

BACKGROUND OF THE INVENTION

Heretofore flexible tubing has been fabricated by winding a strand around an expanded mandrel, adhesively bonding flexible sheet material to the strand, forming end collars for the tube and applying a jacket to the assembly. Ordinarily, the strand is a metal wire of circular cross-section to which adhesive is applied by drawing it through a bath prior to winding or by spraying the mandrel and wound wire. Such techniques require application of a mold release compound to the mandrel to enable convenient separation of the wire helix and overlying sheet material from the mandrel and to minimize the buildup of adhesive on the mandrel. End structures are integrated in the tubing as preformed collars to which are secured the ends of the helix prior to the winding of sheet material thereon or by fabrication on the tubing after the sheet has been wound. The joint between the flexible section of tubing and the end collar is a potential region of failure, it is expensive to produce, and it results in a substantial section of tubing which is not flexible. The application of adhesive by prior techniques has been wasteful and unduly added to the expense of the tubing, particularly where multiple applications have been required. Problems of contact of adhesive with the essentially continuous right circular cylindrical mandrel surface has increased the expense of the tubing. The formation of the helices on the duct forming mandrel inherently produces helices having circumferential springback which must be constrained by the wall duct and thus imposes limits on the physical characteristics of the supporting skeleton of the duct.

SUMMARY OF THE INVENTION

The present invention is directed to method and apparatus for fabricating flexible tubing having a helical skeleton and more particularly a preformed helical skeleton.

An object of the invention is to improve the production of flexible tubing.

A second object is to reduce the expense of manufacture of flexible tubing.

A third object is to maximize the effective utilization of adhesive in the manufacture of flexible tubing.

Another object is to simplify the end construction and the fabrication techniques for such construction for flexible tubing.

A further object is to locate and maintain turns of a preformed helix for fabrication in a flexible tubing.

In accordance with the above objects, one feature of this invention resides in a method of fabricating a flexible tube by positioning the turns of a preformed helix in an array in a predetermined manner with at least a portion of the turns regularly spaced. The positioned turns are supported for rotation and contacted on their outer faces by an adhesive applicator. A flexible sheet material is wound over the adhesive coated faces to provide an envelope for the helical skeleton. The helix is released from its support and removed from the apparatus.

Another feature of the invention comprises mechanism for moving the preformed helix turns into place. The preformed resin bonded, glass fiber helix of the preferred form has a relatively rigid cross-section form so that each turn defines a circle of fixed diameter with a yield point virtually the same as the ultimate strength so that the turns are not distorted. However, the preformed helix longitudinal dimensions are not so constrained so it has little torsional strength, is displaced from its pitch by its own weight, and has virtually no tendency to maintain its turn in axial alignment. A preformed helix of this character is collapsed to a bundle of overlying turns and placed upon a rotatable shaft of substantially less diameter than the internal diameter of a helix turn to function as a helix magazine. A rotatable spacer rod of the same general diameter as the magazine shaft and having a series of collars positioned thereon with separations corresponding to the helix turn spacings desired is coupled to the magazine shaft and at least a pair of leading turns of the helix are secured together with the desired turn spacing. The clamped turns are hung on the rod to straddle a spacer collar and the magazine shaft and spacer rod are then rotated in the direction of the pitch of the helix. This advances the helix along the spacer shaft as a screw with adjacent turns spaced by the spacer collars.

A third feature of the invention involves engaging the inner face of each positioned turn of the preformed helix with a mandrel of restricted area so that the helix is maintained along a straight axis for assembly of the tubing elements. The mandrel comprises three parallel bars each mounted on a shaft by at least a pair of parallel pivoted links so that their spacing from the shaft can be altered according to the inclination of the links thereto.

A fourth feature is the means for applying adhesive to the mandrel supported helix. A horizontal roller having the lower portion of its periphery in a pool of adhesive is brought into engagement with the helix and the helix and roller are rotated to transfer adhesive from the pool to the roller to the outer face of the turns of the helix. This is accomplished without the application of adhesive to those portions of the helix where it serves no useful function or to the mandrel.

Another feature contemplates eliminating the need to apply additional adhesive where a thin porous sheet is applied to the helix prior to an insulating blanket by sustaining sufficient adhesive on the outer face of the helix to penetrate the first layer and bond the blanket thereto.

A further feature involves means affording access to one end of the shaft, assembly and partially processed tube by a plurality of stations as for the helix positioning means, the mandrel engaging means, and a jacket applicator means. In one embodiment, this is accomplished by a unitary combination of the spacer shaft and the expandable mandrel assembly with a pivoted end support to permit the shaft and assembly to be shifted between a plurality of arcuately arrayed processing stations while the positioned, preformed helix is maintained thereon.

DESCRIPTION OF THE DRAWINGS

FIG. 1 is a side elevation, partially sectioned and broken away in layers, of a portion of a duct produced according to this invention;

FIG. 2 is a schematic top view of one layout of the processing stations of the apparatus of this invention with many elements eliminated to illustrate the relative position of certain elements without obscuring detail;

FIG. 3 is an elevation of the composite helix mounting means conditioned for positioning the turns of the preformed helix as it is viewed along line 3—3 of FIG. 2 for the first station of the apparatus of this invention, many of the elements have been broken away or only partially shown in schematic form for clarity;

FIG. 4 is a cross-section of FIG. 3 taken along the line 4—4;

FIG. 5 is an elevation of the composite helix support of the apparatus with the helix turns positioned and showing the helix mandrel expanded to its helix supporting condition for further processing;

FIG. 6 is a cross-section of FIG. 5 taken along the line 6—6;

DETAILED DESCRIPTION OF PREFERRED EMBODIMENTS

Figure 7:
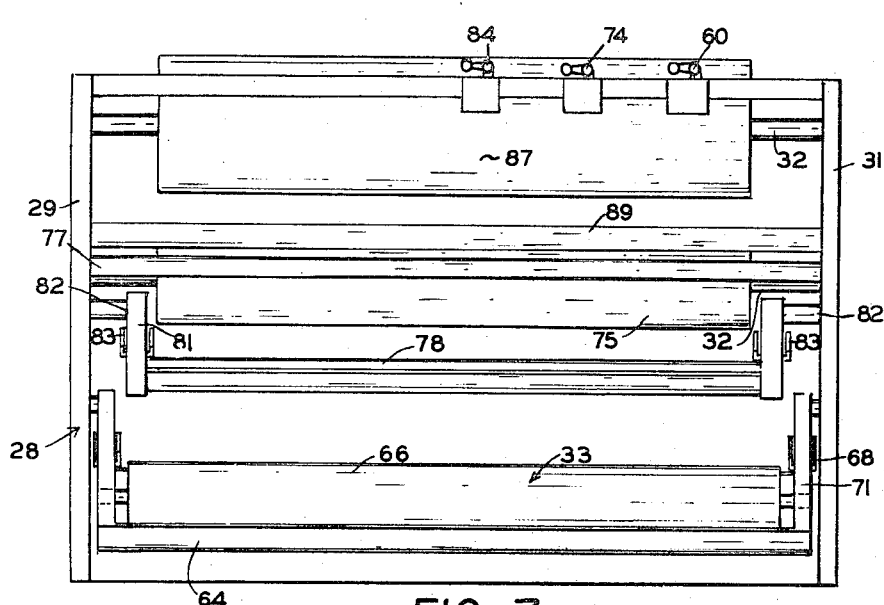
FIG. 7 is an elevation of the second station of the apparatus with the helix mount and mandrel drive eliminated as viewed from line 7—7 of FIG. 2.

One form of flexible tubing or duct suitable for utilization in air-conditioning and heating systems and produced according to the method and with the apparatus of this invention is shown in FIG. 1. It comprises a skeleton 11 of a preformed helix of phenolic bonded glass fibers constructed as disclosed in the aforenoted patent application entitled "Method and Apparatus for Fabricating a Plurality of Filaments Into a Helix." The skeleton is made up of four rovings each having sixty ends where each end contains two hundred continuous filaments of glass about nine microns in diameter. It is bonded by a phenolic resin into a helix strand 12 having a cross-section which is semicircular and flat on its outer surface 13. The strand is about one-eighth inch wide across face 13. A typical duct employs a helix having an inner diameter of each turn of eight inches. In such dimensions, the helix has a well defined circular cross-section in each turn and is relatively unstable, when unsupported and standing alone, in the axial dimension so that its axial alignment of successive turns and pitch between successive turns can be altered with little force.

The duct of FIG. 1 has skeletal end collars 14 made up of a plurality of turns of the helix bonded together as by orienting them in abutting side-by-side alignment and applying adhesive thereto. It has a flexible skeleton section 15 between the collars in which the turns of the helix are spaced at relatively equal intervals.

A thin, flexible, porous sheet material 16, preferably a woven glass fiber scrim, or a bonded glass mat, is adhesively bonded to the flat faces 13 of each turn of the helix. Thermal insulation which can be a flexible blanket of matted fibers is bonded as a first layer 17 to the layer 16 and the helix turns by the penetration of the adhesive on faces 13 through layer 16 to layer 17. Additional layers 18 of blanket can be wound over layer 17. The skeleton and several layers are jacketed by a suitable material 19 providing a gas impervious wall.

Desired characteristics of low cost, structural strength, thermal insulation, fire retardance, tolerance to high temperatures, and flexibility are achieved where the adhesive is a vinyl emulsion obtained as stock No. 6782 HSA. from J. G. Milligan Co. of Milwaukee, Wisconsin, the insulating blanket of layers 17 and 18 is of glass fibers and the jacket 19 is a vinyl chloride tube of about .003 inch wall thickness. However, it is to be understood that alternative materials can be substituted while maintaining the general characteristics desired.

Tubing of the type shown in FIG. 1 is produced by positioning the turns of a preformed helix 11 as desired in the final product. A mechanically stable mounting 21 for further processing is provided for the oriented helix. Adhesive is applied to the outer face 13 of the turns of the helix by a wiping or rolling contact applicator to confine the adhesive to that face and avoid fouling the helix mounting mechanism. The envelope for the helical skeleton of the tubing is then formed, for example by rotating the helix and its mount to wrap layers 16, 17 and 18 of material thereon. In the example, a thin, porous, flexible layer 16 is first applied, then one or more insulating layers 17 and 18. The first layer 16 is secured by the adhesive. Adhesive penetrates the first layer to secure the insulating layer 17 outside it. Where rolled material is employed, the layers are drawn from rolls mounted for rotation and located in proximity to the helix and mount. Multiple layers of insulation are formed from a continuous length of sheet material applied in successive wraps with only the first layer bonded adhesively. The outer layer or layers are retained on the assembly by a close fitting tubular packet 19 drawn thereover while layers retain the radial compression imparted to them by the tension of the winding process. Relief of that tension and the resultant radial expansion of the layers against the tubular jacket secures the assembly. It then is removed from the helix support to clear the apparatus for another production cycle.

A plan layout of one form of multistation apparatus for producing flexible tubing by the above method is shown in FIG. 2. Three positions or stations are provided for the helix mounting means 21. These stations are arcuately arrayed around a bearing 22 mounted to be pivoted in the horizontal plane. A primary shaft 23 of the helix mount is journaled for rotation around its horizontal axis in bearing 22 so that its distal end 24 can be aligned with complementary apparatus at each of the three positions or stations.

Helix orientation for the tubing is established in the first station while helix mount 21 is aligned therewith. In this station a preformed helix 11 is maintained in an axially collapsed form in a magazine which essentially is a stub shaft 25 from which the helix is pendant. A drive 26 for the helix turn positioning mechanism is included in this station.

Adhesive is applied to the helix and the wound sheet material is applied while helix mount 21 is in its second position. A drive 27 for rotating the helix mount is aligned with and coupled to primary shaft 23 and a frame 28 having end members 29 and 31 for supporting shafts 32 and an adhesive applicator 33 is adjacent the helix and its mount when they are in the second position.

In the third position, helix mount 21 is supported as a cantilever by bearings 22 and has its longitudinal axis aligned with a source 34 of jacketing material. Sufficient clearance at the distal end 24 is provided in this station to permit the completed flexible tube to be slid axially along the mount 21 and over the distal end 24 of shaft 23 to remove it from the apparatus.

Helix mount 21 is a composite structure best seen in FIGS. 3 through 6 showing it in the first position and in the helix turn locating state and the helix holding state. It comprises a tubular main shaft 23 journaled in bearing 22 at one end and having a drive coupling 35 at its opposite end. A pair of collars 36 (only one of which is shown in FIGS. 3, 4 and 6) are fixed at spaced positions along the shaft 23 to provide mounting for a helix turn spacer rod 37 and mandrel bars 38. Stanchions 39 extend radially from collar 36 to a collar 41 in which the spacer rod 37 is journaled for rotation. Lever arms 42 are pivoted at 43 to collar 36 and at 44 to mandrel bars 38 to support those bars.

In the first posiiton, mount 21 has spacer rod 37 engaged through coupling 45 to shaft 25 of the spacer rod drive 26 and drive coupling 35 of the main shaft 23 is free. The collapsed helix 46 is mounted as a coil on shaft 25 prior to the positioning of the mount 21 at its first position. Spacing of the helix turns at regular intervals is by spacer collars 47 fixed on spacer rod 37.

To position the helix turns, the leading turn 48 and second turn 49 of the preformed helix are drawn from the coil 46 and secured together as by clamp 51 with a separation corresponding to the desired helix pitch over the flexible section 15 of the final product. These coupled turns are hung over the first spacer collar 47' in the equally spaced series of collars 47 each spaced on centers a distance equal to the pitch to be established in the helix, three quarters of an inch in the example. Collars 47 are about one-half inch wide and stand about one quarter inch beyond the spacer rod for a helix made of a one-eighth inch wide strand having a semicircular cross-section.

Shaft 25 and spacer rod 37 are rotated in the direction of the pitch of helix 11 to advance the helix along spacer rod 37. The frictional engagement of shaft 25 and rod 37 with the inner face of the helix turns causes the shaft and rod to roll the helix in the same direction. Thus, when viewed from coupling 45 to the right in FIG. 3, counter-clockwise rotation is imparted to the helix coil 46 by rotating shaft 25 and rod 37 counter-clockwise. As the helix rotates, it advances as a worm by introducing the leading turn into the next gap between spacer collars 47 to the right in FIG. 3 from that which it entered on its preceding rotation and by carrying succeeding helix turns into the previously occupied gaps. The rate of feed varies with the diameter of the preformed helix. In general, a range of 1.5 to 15 lineal feet of pitch per minute can be fed. Control of the feed speed can be by any conventional electric motor speed control adaptable to the drive motor.

When the helix is distributed across the spacer rod, conveniently somewhat in excess of six feet in length to produce a tubing section of six feet, end collars 14 can be formed by gathering a number of turns in side-by-side abutting relation. This can be done by hand by the operator. A section 52 at each end of the spacer rod of sufficient length to accommodate the turns of the collar is left free of spacer collars 47 for this purpose. The spacer 52 at the feed end of spacer rod 37 is defined by widely spaced spacer collars 47, the first of which 47'' facilitates the orderly and gradual introduction of helix turns into the region of regularly spaced collars 47.

One means of establishing the adjacent relationship of the end collars is to remove the clamp 51 from the leading turns of the helix and to temporarily secure the abutted turns by a length of pressure sensitive tape (not shown) applied to the inner faces of those turns.

With the skeleton turns oriented, they are next fixed in that orientation so that they can be further processed without shifting their relative positions. Mandrel bars 38 are extended radially from shaft 23 to engage the interior of the helix at three locations disposed respectively 60° to the left 180° and 60° to the right from stanchion 39 and thus spacer rod 37. With bars 38 extended against the helix 11, it is raised free of the spacer rod 37 and collars 47 as best seen in FIG. 6 and is concentric with shaft 23 so it can be rotated therewith for further assembly operations.

Extension of the mandrel bars 38 is by lever collars 53 (only one of which is shown) and their extension levers 54 pivotally connected at 55 to collar 53 and at 44 to lever 42 and bar 38. When bars 38 are retracted, collars 53 are adjacent their respective collars 36 and levers 54 approach parallelism with levers 42, as seen in FIG. 3. Reciprocation of collars 53 to the left as viewed in FIGS. 3 and 5 to space them from collars 36 move the levers toward a radial position by their pivoting action around pivots 44 so that the pivots 44, levers 42 and bars 38 move radially outward from shaft 23 as shown in FIG. 5. Collars 63 have open centers across which pins 50 extend through longitudinal slots 56 in the walls of shaft 23 to a rod 57 coaxial with the shaft and reciprocated with respect thereto as by a two-way pneumatic cylinder 58 and piston mounted on the base plate 59 pivotally supporting bearings 22. Relative rotation between the collars 53 and the cylinder 58 is permitted by a rotary coupling (not shown) which may be between the rod 57 and the piston rod from cylinder 58. Air hoses 61 and 62 communicate with the ends of the cylinder 58 on each side of the actuating piston so that control valve 60 can be set by the operator to extend or retract the mandrel bars 38.

With the mandrel bars extended to engage the interior of each turn of helix 11 at points spaced 120°, the spacer rod 37 is uncoupled from feed rod 25 and drive 26 by release of coupling 45. This is done by axial motion of one of the interfitting coupling elements in a manner which is well known. The helix mount 21 is then pivoted around the pivot for base plate 59 to the second position of FIG. 2 and mandrel shaft 23 is engaged with mandrel drive 27 by coupling 63. The duct skeleton is conditioned to receive adhesive and the layers 16, 17 and 18.

Figure 8:
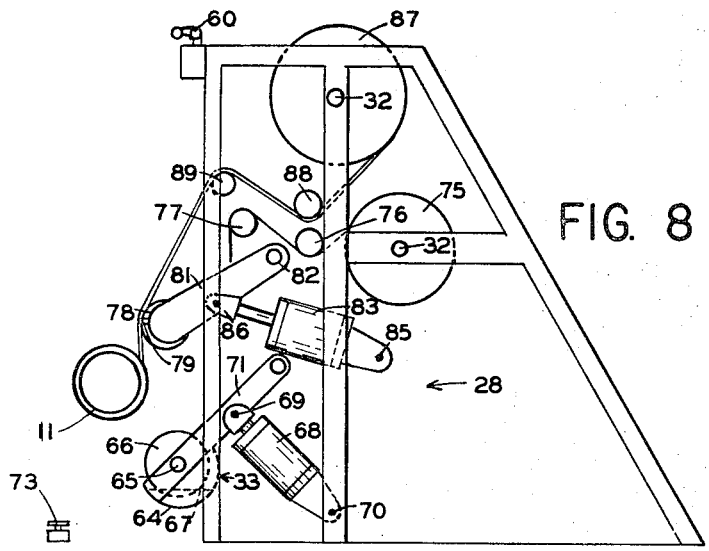
FIG. 8 is a schematic side view of the second station with details of the helix mount and mandrel drive omitted as viewed from the right side of FIG. 6 and showing the adhesive applicator positioned to engage the mounted helix.

A frame 28 having ends 29 and 31 supports the elements employed in further fabrication of the flexible duct as can be seen in FIGS. 2, 7 and 8. Adhesive applicator 33 comprises a trough 64 on the ends of which are journals 65 in which is rotatably supported a coating cylinder 66. As cylinder 66 is rotated, its lower portion of the cylinder dips into a pool 67 of adhesive, FIG. 8, to pick up adhesive from the pool. Cylinder 66 is moved to and from helix skeleton 11 by a pneumatic drive 68 comprising cylinders pivoted at 70 to frame 28 having piston rods extending to pivotal connections 69 to support arms 71 for the applactor assembly. Applicator support arms 71 are pivoted to frame 28 to enable the applicator to be raised in an arc so that a portion of cylinder 66 protruding from trough 64 engages the outer face of the helix skeleton 11 while its rotational axis is parallel to the axis of rotation of the skeleton.

Adhesive is applied by rotating skeleton 11 while cylinder 68 rotates to pick up adhesive from the pool and deposit it on the outer face of the helix turns. All of the circumference of the helix is coated. Rotation of the mandrel by drive 27 is through the drive shaft 72 and coupling 63 to shaft 23 and is controlled by the operator by a foot pedal rheostat switch 73 where the speed of the drive is a function of the degree to which the switch is depressed. Conveniently, the cylinder 66 can be driven (by means not shown) as by an electric motor mounted on one of arms 71 coupled to the shaft of cylinder 66 through a drive belt and an overriding clutch which permits the cylinder to be driven by the frictional engagement of helix 11 when that helix is driven at a faster speed than the cylinder.

When the helix is coated over its entire outer circumference, the adhesive applicator is retracted by actuating the two-way drive 68 from its two-way control 74 mounted on frame 28. Control 74 can be a lever actuated pneumatic valve and can be arranged to energize the drive motor for rotating cylinder 66 coincidental to the advance of the applicator from its retracted position (by means not shown).

Sheet material is next applied to the adhesive coated skeleton 11. Where duct, as shown in FIG. 1, is to be produced, a first layer 16 of thin, porous flexible sheet such as woven glass scrim is drawn from payoff roll 75 over tensioning guide rolls 76 and 77 and wrapped around the adhesive coated skeleton 11. The operator draws the material of layer 16 which is pendant from guide roll 77 down, underneath and up around skeleton 11 to initiate the wrap and then actuates the mandrel drive by means of foot pedal 73 as needed to complete the wrap. When a complete layer has been applied, the layer is separated from the goods from payoff roll 75 by cutting the goods with a blade (not shown) fitted in cutting guide 78.

Cutting guide 78 can be a roller having a longitudinal slot 79 and can be mounted to extend the roll goods from frame 28 toward the mandrel mounted skeleton. A mounting arm 81 supports guide roller 78 from pivots 82 to frame 28 so that pneumatic extension drive 83 can be controlled by pneumatic control valve 84 to either a retracted or extended position. Drive 83 may be a two-way drive cylinder pivoted to frame 28 at pivot 85 and having its piston rod pivoted to cutting guide arm 81 at pivot 86. The cutting guide can be extended after the wrap of the roll goods has been stated on skeleton 11, thereby aiding in maintaining the goods firmly against the skeleton. It is retracted upon completion of the severance of the wrapped goods from its supply roll.

Layers 17 and 18 are next wrapped over layer 16, by drawing the roll goods, in the example flexible fiber glass blanket from payoff roll 87 over tensioning guide rolls 88 and 89, beneath scrim covered helix 11 and up around the helix. The cutting guide 78 can then be advanced and the foot pedal operated to rotate the mandrel drive 27, as needed. When the desired number of wraps have been applied, the roll goods are cut off using the cutting guide 78 as described. The final wrap is held in place temporarily while the mandrel assembly, and the partially completed duct are moved to position three in FIG. 2 for jacketing. When the desired types of covering material, which may include, in addition to the fiber glass blanket and scrim of the example, alternative insulating materials, aluminum foil or any other flexible type roll goods, are wrapped, those goods which are compressible are slightly compressed radially by the tension of the wrapping operation. The compression is retained until the subassembly is jacketed by placing an elongated weight as a metal rod 91 on the upper surface of the duct parallel to its longitudinal axis. This can be done prior to the cutoff of the roll goods from its payoff roll.

Figure 9:
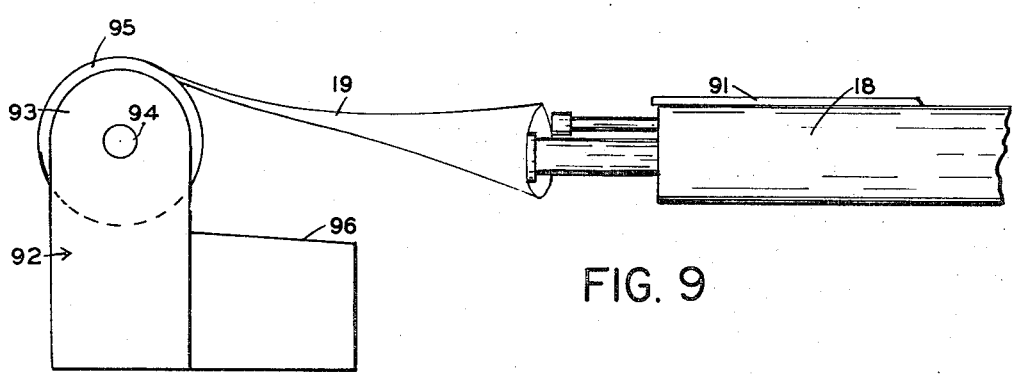
FIG. 9 is an elevation of the third station of the apparatus for applying jacketing material to the tubing structure.

Coupling 63 is released from shaft 23 and the mandrel, subassembly and hod-down rod 91 are swung around the pivot for base plate 59 to axial alignment with the jacketing material 19, as shown in FIG. 9. One suitable jacket is a rolled tube of vinyl chloride sheet material supported on rack 92 having roll supports 93 for a shaft 94 on which a roll 95 of jacketing is mounted. A table 96 integral with the rack 92 maintains a free end of the tubing conveniently available to the end of the duct subassembly in position 3. Tubing 19 is drawn over the free end of the subassembly and along its length to cover the insulation 18. It is then severed from the roll beyond the free end of the insulation and the hold-down rod 91 is withdrawn from within the jacket thereby permitting the radially compressed insulating to expand and bind the jacket to the structure.

The completed duct is removed from the mandrel by transferring the mandrel extension control 60 to its retraction position whereby the extension drive 58 moves rod 57 to the right as viewed in the several drawings. Collars 53 are thereby moved to the right and then extension levers 54 are moved toward parallelism with levers 42 to retract the mandrel bars 38 toward shaft 23 and release the helix 11 therefrom. The duct section is then slid axially off of the free end of the helix mount 21 to clear the apparatus for another processing cycle.

Another cycle is initiated by mounting a coil of the resin bonded preformed helix on the shaft 25, rotating the helix mount 21 to locate the spacer rod 37 in the uppermost position and coupling that rod to the shaft 25 by coupling 45.

It is to be appreciated that various modifications can be incorporated in the apparatus to facilitate manipulation of its parts and the material it utilizes. The apparatus lends itself to production of a range of sizes of duct by virtue of the range of expansion of the mandrel bars 38 and can accommodate different helix mounting assemblies 21 where duct beyond the range of the illustrated mounting is to be produced. While a particular form of helix coil positioning mechanism has been disclosed, that mechanism can be modified as by a serpentine support across which the leading turn of the helix is carried while relative motion between the support and helix causes the following helix turns to fall into spaced valleys in the support. Other variants can include a turret array of work stations whereby the helix mount 21 is maintained in one position and the several complementary combinations of apparatus moved into position relative to the mount as by positioning the helix feed and spacer rod drive into alignment with shaft 23 followed by the mandrel drive 27 and then the jacketing apparatus and supply.

In view of the modifications and variations available, it should be understood that the above disclosure is presented as illustrative and is not to be read in a limiting sense.

What is claimed is:

1. Apparatus for producing flexible tubing comprising a first station for positioning turns of a preformed helix having relatively rigid individual returns in the cross-sectional dimension thereof to form a skeleton for said tubing; a second station for said positioned helix; an adhesive applicator at said second station for contacting the positioned helix turns to coat the outer face of the turns with adhesive; means at said second station to wrap flexible sheet material on said adhesive coated turns; a third station for said positioned helix; and a jacket supply at said third station for supplying jacketing material to said flexible sheet material on said helix; and said first station including a rotatable shaft, means mounting said shaft at one end for rotation about its longitudinal axis; means supporting said mounting means for pivotal motion about an axis normal to the longitudinal axis of said shaft; and wherein at least portions of said second and third stations are displaced from said first station in an arcuate array around said pivotal support.

2. A combination according to claim 1 wherein said first station includes a stationary located drive for said means spacing said helix turns; said means spacing said helix turns includes a rod supported on said shaft; a releasable coupling between said rod and said spacer drive to couple the rod and drive when said shaft is at said first station; wherein said second station includes a stationary located drive for said shaft to rotate said shaft about its longitudinal axis; and a releasable coupling between said shaft and said shaft drive to couple said shaft and drive when said shaft is at said second station.

3. Method of forming flexible tubing which comprises positioning the turns of a preformed helix on a support; securing said positioned helix turns internally of said helix; rotating said secured helix turns against an adhesive applicator to apply adhesive to the outer faces of said turns; wrapping flexible sheet material on said adhesive coated outer faces of said turns, said flexible sheet material being thin and porous to pass adhesive from said outer faces of said turns to the exterior of said sheet; and wrapping a second flexible sheet material on said first wrapped flexible sheet material to bond said second sheet material to said first wrapped sheet material by said adhesive.

4. Method of forming flexible tubing which comprises positioning the turns of a preformed helix on a support; securing said positioned helix turns internally of said helix; rotating said secured helix turns against an adhesive applicator to apply adhesive to the outer faces of said turns; and wrapping flexible sheet material on said adhesive coated outer faces of said turns, including the step of wrapping a plurality of turns of continuous compressible sheet material while maintaining tension thereon, whereby said compressible sheet material is compressed radially of the longitudinal axis of said tubing; drawing a jacket of tubular material over said compressible sheet material while said compressible sheet material is compressed; and releasing said compressible sheet material to permit radial expansion thereof into binding relation with said jacket.

References Cited

UNITED STATES PATENTS

| | | | |
|---|---|---|---|
| 2,343,747 | 3/1944 | Chernack | 156—144 X |
| 2,913,011 | 11/1959 | Noyes et al. | 156—144 X |
| 2,813,573 | 11/1957 | Roberts | 156—144 |
| 3,439,851 | 4/1969 | Rum et al. | 226—200 X |
| 3,500,877 | 3/1970 | Lingen et al. | 226—168 UX |

FOREIGN PATENTS

| | | | |
|---|---|---|---|
| 833,054 | 4/1960 | Great Britain | 156—143 |
| 467,490 | 8/1950 | Canada | 156—143 |

DOUGLAS J. DRUMMOND, Primary Examiner

D. A. SIMMONS, Assistant Examiner

U.S. Cl. X.R.

156—189, 294, 429